(12) United States Patent
Yi et al.

(10) Patent No.: US 9,125,164 B2
(45) Date of Patent: Sep. 1, 2015

(54) METHOD OF TRANSMITTING POWER HEADROOM REPORTING IN WIRELESS COMMUNICATION SYSTEM

(75) Inventors: Seung-June Yi, Gyeonggi-Do (KR); Sung-Jun Park, Gyeonggi-Do (KR); Young-Dae Lee, Gyeonggi-Do (KR); Sung-Duck Chun, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 12/457,645

(22) Filed: Jun. 17, 2009

(65) Prior Publication Data

US 2009/0318180 A1 Dec. 24, 2009

Related U.S. Application Data

(60) Provisional application No. 61/073,743, filed on Jun. 18, 2008, provisional application No. 61/108,156, filed on Oct. 24, 2008, provisional application No. 61/119,343, filed on Dec. 2, 2008, provisional application No. 61/142,257, filed on Jan. 2, 2009.

(30) Foreign Application Priority Data

Jun. 16, 2009 (KR) .......................... 10-2009-0053587

(51) Int. Cl.
*H04B 7/00* (2006.01)
*H04W 52/36* (2009.01)
*H04W 74/00* (2009.01)
*H04W 72/00* (2009.01)

(52) U.S. Cl.
CPC .......... *H04W 52/365* (2013.01); *H04W 74/004* (2013.01); *H04W 72/00* (2013.01); *Y02B 60/50* (2013.01)

(58) Field of Classification Search
CPC .......... H04W 52/365; H04W 72/0413; H04W 72/10; H04W 80/02; Y02B 60/50
See application file for complete search history.

(56) References Cited

U.S. PATENT DOCUMENTS

| 6,594,240 B1 | 7/2003 | Chuah et al. |
| 6,785,548 B2 | 8/2004 | Moulsley et al. |
| 6,836,469 B1 | 12/2004 | Wu |

(Continued)

FOREIGN PATENT DOCUMENTS

| CN | 1192561 C | 3/2005 |
| EP | 1 755 355 | 2/2007 |

(Continued)

OTHER PUBLICATIONS

Ericsson, "Correction to UE transmission power headroom report for LTE", May 15-18, 2008, Jeju Island, Korea, R2-083897.

(Continued)

*Primary Examiner* — Fanghwa Wang
(74) *Attorney, Agent, or Firm* — Dentons US LLP

(57) ABSTRACT

Disclosed is related to a method of effectively transmitting a power headroom report (PHR) from the terminal to the base station in an evolved universal mobile telecommunications system (E-UMTS) evolved from universal mobile telecommunications system (UMTS) or a long term evolution (LTE) system, and more particularly, to a method of providing the power headroom report after determinations of whether the power headroom reporting is triggered and whether allocated uplink resource(s) accommodate a medium access control (MAC) control element.

12 Claims, 6 Drawing Sheets

(56) References Cited

U.S. PATENT DOCUMENTS

| | | |
|---|---|---|
| 7,075,971 B2 | 7/2006 | Parsa et al. |
| 7,848,346 B2 | 12/2010 | Park et al. |
| 7,957,298 B2 | 6/2011 | Yi et al. |
| 7,986,946 B2 | 7/2011 | Pettersson |
| 2001/0043582 A1 | 11/2001 | Nakada |
| 2002/0009067 A1 | 1/2002 | Sachs et al. |
| 2002/0154653 A1 | 10/2002 | Benveniste |
| 2002/0167920 A1 | 11/2002 | Miyazaki et al. |
| 2003/0095534 A1 | 5/2003 | Jiang |
| 2004/0147276 A1 | 7/2004 | Gholmieh et al. |
| 2004/0185892 A1 | 9/2004 | Iacono et al. |
| 2005/0014508 A1 | 1/2005 | Moulsley et al. |
| 2005/0078641 A1 | 4/2005 | Kim |
| 2005/0117675 A1 | 6/2005 | Das et al. |
| 2005/0141436 A1 | 6/2005 | Dick et al. |
| 2005/0249123 A1 | 11/2005 | Finn |
| 2006/0013182 A1 | 1/2006 | Balasubramanian et al. |
| 2006/0013268 A1 | 1/2006 | Terry |
| 2006/0280145 A1 | 12/2006 | Revel et al. |
| 2007/0206531 A1 | 9/2007 | Pajukoski et al. |
| 2008/0008212 A1 | 1/2008 | Wang et al. |
| 2008/0096563 A1 | 4/2008 | Fischer et al. |
| 2008/0098234 A1 | 4/2008 | Driscoll et al. |
| 2008/0186892 A1 | 8/2008 | Damnjanovic |
| 2008/0188247 A1 | 8/2008 | Worrall |
| 2008/0192766 A1 | 8/2008 | Ranta-Aho et al. |
| 2008/0207150 A1 | 8/2008 | Malladi |
| 2008/0232317 A1 | 9/2008 | Jen |
| 2008/0310396 A1 | 12/2008 | Park |
| 2008/0313300 A1 | 12/2008 | Alanara et al. |
| 2008/0316961 A1 | 12/2008 | Bertrand et al. |
| 2009/0088195 A1* | 4/2009 | Rosa et al. ............... 455/507 |
| 2009/0156194 A1 | 6/2009 | Meylan |
| 2009/0175187 A1 | 7/2009 | Jersenius et al. |
| 2009/0213968 A1 | 8/2009 | Tormalehto |
| 2009/0225711 A1 | 9/2009 | Sammour et al. |
| 2009/0259910 A1 | 10/2009 | Lee et al. |
| 2009/0303954 A1* | 12/2009 | Guo ............... 370/329 |
| 2009/0305665 A1 | 12/2009 | Kennedy et al. |
| 2009/0316593 A1 | 12/2009 | Wang et al. |
| 2010/0027511 A1 | 2/2010 | Terry |
| 2010/0080181 A1 | 4/2010 | Yamada et al. |
| 2010/0093386 A1 | 4/2010 | Damnjanovic et al. |
| 2010/0202288 A1 | 8/2010 | Park et al. |
| 2010/0226325 A1 | 9/2010 | Chun et al. |
| 2010/0260136 A1 | 10/2010 | Fan et al. |
| 2010/0281486 A1 | 11/2010 | Lu et al. |
| 2011/0116364 A1 | 5/2011 | Zhang et al. |
| 2011/0216705 A1 | 9/2011 | Lee et al. |
| 2011/0216706 A1 | 9/2011 | Lee et al. |

FOREIGN PATENT DOCUMENTS

| | | |
|---|---|---|
| EP | 1 973 281 | 9/2008 |
| EP | 2 094 053 | 8/2009 |
| EP | 2 136 599 | 12/2009 |
| JP | 2000-341204 A | 12/2000 |
| JP | 2007-266733 | 10/2007 |
| JP | 2010-518724 A | 8/2008 |
| JP | 2009139075 A | 6/2009 |
| JP | 2009-525655 A | 7/2009 |
| JP | 2009303213 A | 12/2009 |
| JP | 2011-508538 A | 3/2011 |
| KR | 10-0567211 | 4/2006 |
| KR | 10-2006-0115175 | 11/2006 |
| KR | 10-2006-0120115 | 11/2006 |
| KR | 10-2007-0107619 | 11/2007 |
| KR | 10-2007-0108300 A | 11/2007 |
| KR | 10-2007-0109313 A | 11/2007 |
| KR | 10-2008-0016367 | 2/2008 |
| KR | 10-2008-0026583 | 3/2008 |
| KR | 10-2008-0039177 | 5/2008 |
| KR | 10-2008-0039294 | 5/2008 |
| KR | 20080039177 A | 5/2008 |
| KR | 10-2008-0049596 | 6/2008 |
| KR | 10-2008-0065880 | 7/2008 |
| KR | 10-2008-0112649 | 12/2008 |
| KR | 10-2009-0014937 | 2/2009 |
| KR | 10-2009-0016402 | 2/2009 |
| KR | 10-2009-0084690 | 8/2009 |
| RU | 2233546 | 7/2004 |
| RU | 2332802 | 8/2008 |
| WO | WO 2004/056009 | 7/2004 |
| WO | 2006118427 A1 | 11/2006 |
| WO | 2006118427 A2 | 11/2006 |
| WO | WO 2007/082407 | 7/2007 |
| WO | WO 2007/083230 | 7/2007 |
| WO | WO 2007/128204 | 11/2007 |
| WO | WO 2007/143916 | 12/2007 |
| WO | WO 2008/024628 | 2/2008 |
| WO | WO 2008/042967 | 4/2008 |
| WO | WO 2008/054112 | 5/2008 |
| WO | 2008/100009 A1 | 8/2008 |
| WO | 2008100009 A1 | 8/2008 |
| WO | WO 2008/097023 | 8/2008 |
| WO | WO 2008/097030 | 8/2008 |
| WO | WO 2008/131401 | 10/2008 |
| WO | WO 2008/155469 | 12/2008 |
| WO | WO 2009/005429 | 1/2009 |
| WO | WO 2009/023470 | 2/2009 |
| WO | 2009/086188 A2 | 7/2009 |
| WO | WO 2009/086188 A2 | 7/2009 |
| WO | WO 2009/088858 | 7/2009 |
| WO | WO 2009/096195 A1 | 8/2009 |

OTHER PUBLICATIONS

Texas Instruments Inc., "Handover Failure Handling", 3GPP TSG-RAN WG2 Meeeting #61, R2-081504, Feb. 2008.

Technical Specification Group Radio Access Network; Evolved Universal Terrestrial Radio Access (E-UTRA) Medium Access Control (MAC) protocol specification; (3GPP TS 36.321, Jun. 2008).

TS 36.321 V8.1.0, Mar. 2008.

$3^{rd}$ Generation Partnership Project; Technical Specification Group Radio Access Network; Evolved universal Terrestrial Radio Access (E-UTRA) Medium Access control (MAC) protocol specification (Release 8), v8.3.0 (Sep. 2008).

LG Electronics, "Message 2 Structure with Back-Off Parameters", 3GPP TSG-RAN WG2 #61, R2-081035, Feb. 2008.

LG Electronics, "Discussion on random access back-off procedure", 3GPP TSG-RAN WG2 #60bis, R2-080189, Jan. 2008.

MAC Rapporteurs et al., "E-UTRA MAC protocol specification update", 3GPP TSG-RAN2 meeting #61bis, R2-081719, Apr. 2008.

NTT DoCoMo, Inc., "RA response format", 3GPP TSG RAN WG2 #60bis, R2-080451, Jan. 2008.

LG Electronics Inc., "Missing condition for unsuccessful reception of Msg2", 3GPP TSG-RAN2 meeting #64bis, R2-090323, Jan. 2009.

"$3^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321, V8.2.0, May 2008, XP050377618.

"CR Covering Agreements of RAN 2 #61 bis"; $3^{rd}$ Generation Partnership Project (3GPP); R2-082049; XP050139679; Apr. 2008.

"Disassembly, Demultiplexing and Multiplexing Functions"; $3^{rd}$ Generation Partnership Project (3GPP); R2-091633; XP050323507; Feb. 2009.

A. Ghosh et al., "Random Access Design for UMTS Air-Interface Evolution", IEEE $65^{th}$ Vehicular Technology Conference, Apr. 22, 2007, pp. 1041-1045.

LG Electronics Inc., "Correction to Multiplexing Procedure for BSR", 3GPP TSG-RAN2 Meeting #62bis, R2-083275, Jun.-Jul. 2008.

Infineon, "TP for the UL logical channel prioritization", 3GPP TSG RAN WG2 Meeting #62, R2-082504, May 2008.

LG Electronics Inc., "BSR priority", 3GPP TSG-RAN WG2 #61bis, R2-081589, Apr. 2008.

MAC Rapporteurs, "36.321 CR covering agreements of RAN2 #61 bis and RAN2#62", 3GPP TSG-RAN2 Meeting #62, R2-082902, May 2008.

(56) References Cited

OTHER PUBLICATIONS

Panasonic, "Priority handling of MAC Control Elements", 3GPP TSG RAN WG2#62, R2-082227, XP-002537451, May 2008.
Alcatel-Lucent, "TP on Power Headroom reporting", 3GPP TSG RAN WG2 #62, R2-082224, May 2008.
Nokia Corporation et al., "Power Headroom reporting" 3GPP TSG-RAN WG2 Meeting #62, R2-082197, May 2008.
Ericsson, "UE transmission power headroom report for LTE", 3GPP TSG RAN WG2 #62, R2-082147, May 2008.
Nokia Siemens Network et al., "Triggers for Power Headroom Reports in EUTRAN Uplink", 3GPP TSG RAN WG1 #52 Meeting, R1-080947, Feb. 2008.
Nokia Corporation et al., "Scheduling Information for E-UTRAN uplink", 3GPP TSG-RAN WG2 Meeting #59bis, R2-073909, Oct. 2007.
MAC Rapporteurs, "E-UTRA MAC protocol specification update", 3GPP TSG-RAN2 Meeting #61, R2-081389, Feb. 2008.
Panasonic, "Clarification on 'Active Time' definition", 3GPP TSG RAN WG2 #62, R2-082225, May 2008.
LG Electronics Inc. et al., "Restriction to PDCCH for Contention Resolution", 3GPP TSG-RAN WG2 #62, R2-082509, May 2008.
LG Electronics Inc., "DL Grant in Random Access Response", 3GPP TSG-RAN WG2 #60, R2-074787, Nov. 2007.
ETSI TS 136 300 V8.4.0, "Evolved Universal Terrestrial Radio Access (E-UTRA) and Evolved Universal Terrestrial Radio Access (E-UTRAN); Overall Description; Stage 2", XP014041816, Apr. 2008.
Sunplus mMobile Inc., "Align the DRX Active Time with RA procedure", 3GPP TSG-RAN WG2 Meeting #62bis, R2-083428, Jul. 2008.
LG Electronics Inc., "Correction to DRX", 3GPP TSG-RAN2 Meeting #62bis, R2-083274, Jun.-Jul. 2008.
MAC Rapporteurs, "E-UTRA MAC protocol specification update", 3GPP TSG-RAN2 Meeting #61bis, R2-081719, Mar.-Apr. 2008.
LG Electronics, "Corrections to the Random Access Response reception", 3GPP TSG-RAN WG2 #62, R2-082447, May 2008.
LG Electronics Inc., "Correction to RACH Procedure", 3GPP TSG-RAN2 Meeting #64, R2-086137, Nov. 2008.
LG Electronics, "Message 2 Structure with Back-Off Paramaters", 3GPP TSG-RAN WG2 #61 R2-081035, Feb. 15, 2008.
LG Electronics Inc., Nokia Siemens Networks, Huawei, Qualcomm Europe, "Reflection of RAN1 LS on timing adjust and addition of MAC padding in random access response", 3GPP TSG-RAN2 Meeting #64 R2-086374, Nov. 14, 2008.
Huawei, "Corrections to Random Access Procedure", 3GPP TSG-RAN WG2 Meeting #64 R2-087042, Nov. 14, 2008.
LG Electronics Inc., "Missing condition for unsuccessful reception of Msg2", 3GPP TSG-RAN2 Meeting #64bis R2-090323, Jan. 16, 2009.
$3^{rd}$ Generation Partnership Project; Technical Specification Group Radio Access Network; Evolved Universal Terrestrial Radio Access (E-UTRA) Medium Access Control (MAC) protocol Specification (Release 8), 3GPP TS 36.321 V8.1.0 (Mar. 2008), pp. 11-14.
"Triggers for Power Headroom Reports in EUTRAN Uplink", 3GPP TSG RAN WG1 Meeting #52bis R1-081464, Mar. 31, 2008,pp. 1-2.
R2-082227, Panasonic, "Priority handling of MAC Control Elements", pp. 1-3, May 5, 2008.
R2-082902, 3GPP TSG-RAN2 Meeting #62, "Evolved UIniversal Terrestrial Radio Access (E-UTRA) Medium Access Control (MAC) protocol specification," pp. 14-21, Mar. 31, 2008.
Dalman et al., "3G Evolution HSPA and LTE for Mobile Broadband", Elsevier, edition 2, p. 441 (2008).
R2-080189 "3 GPP TSG-RAN WG2 #60bis" Discussion on Random Access Back-Off Procedure, Sevilla, Spain, Jan. 14-18, 2008.
3GPP TS 36.523-1 V8.0.0, User Equipment (UE) conformance specification, Part 1: Protocol conformance specification, Dec. 2008, http://www.3gpp.org/ftp/Specs/archive/36_series/36.523-1/36523-1-800.zip.
3GPP TSG-RAN2 Meeting #62bis, Correction to MAC PDU Format for Random Access Response, LG Electronics Inc., Apr. 7, 2008, R2-083370, http://www.3gpp.org/ftp/tsg_ran/WG2_RL2/TSGR2_62bis/Docs/R2-083370.zip.
"E-UTRA MAC Protocol Specification Update", 3GPP TSG-RAN2 Meeting #61bis Shenzhen, China, Mar. 31-Apr. 4, 2008, R2-081719.
"Message 2 Structure with Back-Off Parameters", 3GPP TSG-RAN WG2 #61 Sorrento, Italy, Feb. 11-15, 2008 R2-081035.
3GPP TS 36.321 V8.2.0 (May 2008) : 3rd Generation Partnership Project; Technical Specification Group Radio Access Network; Evolved Universal Terrestrial Radio Access (E-UTRA) Medium Access Control (MAC) protocol specification.
3GPP TS RAN2 #60bis: Discussion of Message 3, Document for: Discussion and Decision, R2-080239, Sevilla, Spain, Jan. 14-18, 2008.
Ericsson, LG Electronics, Inc.: Prioritization of MAC control elements, 3GPP TSG RAN WG2 Meeting #64 36.321 CR 0167, rev. 2, V. 8.3.0, R2-087413, Prague, Czech Republic, Nov. 10-14, 2008.

* cited by examiner

METHOD OF TRANSMITTING POWER HEADROOM REPORTING IN WIRELESS COMMUNICATION SYSTEM

This application claims priority to U.S. Provisional Application No. 61/073,743, filed Jun. 18, 2008, U.S. Provisional Application No. 61/108,156, filed Oct. 24, 2008, U.S. Provisional Application No. 61/119,343, filed Dec. 2, 2008, U.S. Provisional Application No. 61/142,257, filed Jan. 2, 2009, and Korean Patent Application No. 10-2009-0053587 filed on Jun. 16, 2009, each of which is hereby incorporated by reference in its entirety as if fully set forth herein.

TECHNICAL FIELD

The present invention relates to a wireless communication system and a terminal providing a wireless communication service and to a method by which a base station and a terminal transmit and receive data in an evolved universal mobile telecommunications system (E-UMTS) evolved from universal mobile telecommunications system (UMTS) or a long term evolution (LTE) system, and more particularly, to a method of effectively transmitting a power headroom report (PHR) from the terminal to the base station.

BACKGROUND ART

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIG. 2 and FIG. 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

As mentioned above, the base station and the UE are two main entities constituting the E-UTRAN. Radio resources in a single cell include uplink radio resources and downlink resources. The base station handles allocating and controlling of uplink radio resources and downlink radio resources of the cell. Namely, the base station determines which UE uses which radio resources at which moment. For example, the base station may determine to allocate frequency from 100 Mhz to 101 Mhz to a user 1 for downlink data transmission in 3.2 seconds. After such determination, the base station informs the UE accordingly so that the UE can receive downlink data. Also, the base station may determine when and which UE is allowed to transmit uplink data by using which and how many radio resources, and then informs a corresponding UE accordingly, so that the UE can transmit data by using the radio resources for the corresponding time. In the related art, a single terminal keeps using a single radio resource during a call connection, which is irrational for the recent services which are mostly based on IP packets. That is, in most packet services, packets are not continually generated during a call connection but there are intervals in the call during which none is transmitted. Thus, continuously allocating radio resources to the single terminal is ineffective. To solve this problem, the E-UTRAN system employs a method in which radio resources are allocated to the UE in the above-described manner only when the UE requires it or only when there is service data.

In general, a dynamic radio resource scheduling is a method for informing radio resources to be used every time of a transmission or reception of UE. FIG. 4 is an exemplary view showing the operations of the dynamic radio resource allocation. Typically, an uplink radio resource allocation (e.g., UL GRANT) message or downlink radio resource allocation (e.g., DL ASSIGNMENT) message is transmitted via a Physical Downlink Control Channel (PDCCH). Accordingly, a UE receives or monitors the PDCCH at every designated time. Upon receiving a UE identifier (e.g., C-RNTI) allocated, then the UE receives or transmits radio resources indicated in the UL GRAT or DL ASSIGNMENT transmitted via the PDCCH, and then uses the radio resources to enable data transmission/reception between the UE and eNode B.

In more detail, in the LTE system, in order to effectively use radio resources, the base station should know which and how many data each user wants to transmit. In case of downlink data, the downlink data is transferred from an access gateway to the base station. Thus, the base station knows how many data should be transferred to each user through downlink. Meanwhile, in case of uplink data, if the UE does not directly provide the base station with information about data the UE wants to transmit to uplink, the base station cannot know how many uplink radio resources are required by each UE. Thus, in order for the base station to appropriately allocate uplink radio resources to the UEs, each UE should provide information required for the base station to schedule radio resources to the base station.

To this end, when the UE has data to be transmitted, it provides corresponding information to the base station, and the base station transfers a resource allocation message to the UE based on the received information.

In this process, namely, when the UE informs the base station that it has data to be transmitted, the UE informs the base station about the amount of data accumulated in its buffer. It is called a buffer status report (BSR).

The BSR is generated in the format of a MAC control element, included in a MAC PDU, and transmitted from the UE to the base station. Namely, uplink radio resources are required for the BSR transmission, which means that uplink radio resource allocation request information for BSR transmission should be sent. If there is allocated uplink radio resource when the BSR is generated, the UE would transmit the BSR by using the uplink radio resource. The procedure of sending the BSR by the UE to the base station is called a BSR procedure. The BSR procedure starts 1) when every buffer does not have data and data is newly arrived to a buffer, 2) when data is arrived to a certain empty buffer and a priority level of a logical channel related to the buffer is higher than a logical channel related to the buffer previously having data, and 3) when a cell is changed. In this respect, with the BSR procedure triggered, when uplink radio resources are allocated, if transmission of all the data of the buffer is possible via the radio resources but the radio resources are not sufficient to additionally include the BSR, the UE cancels the triggered BSR procedure.

Here, a power headroom report (PHR) may also exist apart from the BSR. The power headroom report notifies or indicates how much additional power can be used by the terminal. Namely, the PHR may represent a power offset between a most capable transmitting power of the terminal and a current transmitting power of the terminal. This can be also defined as the difference between a nominal UE maximum transmit power and an estimated power for UL-SCH transmission.

The main reason that the terminal transmits the PHR to the base station is to allocate a proper amount of radio resources for the terminal. For example, it is assume that a maximum transmit power of the terminal is a 10 W and the terminal currently uses a 9 W power output using a 10 Mhz frequency range. If a 20 Mhz frequency range is allocated to the terminal, the terminal needs an 18 W power (9 W×2). However, as the maximum transmit power of the terminal is limited to the 10 W, if the 20 Mhz frequency range is allocated to the terminal, the terminal can not use entire frequency range, or, due to the lack of the power, the base station can not receives a signal from the terminal.

Most of current communication traffics are on basis of an Internet service in modern technologies. And, one characteristic of data used in the Internet service is that these data are suddenly generated without any anticipation. Further, an amount of generated data is also bursty and unpredictable. Therefore, in case that the terminal suddenly has data that is need to be transmitted, if the base station has information related to the PHR from the terminal beforehand, it will be much easily for the base station to allocate a proper amount of radio resources for the terminal. Here, the PHR itself is not transmitted to the base station with a reliable manner. Namely, all PHR transmitted from the terminal, are not successfully received by the base station. Therefore, in related art, a periodic PHR transmission is used. Specifically, the terminal operates a timer (i.e. a periodic PHR timer), and transmits the PHR to the base station whenever the timer expires.

In the related art, the terminal triggers a periodic PHR when the periodic timer is expired. If the periodic PHR is actually transmitted, the terminal restarts the periodic timer. Here, the PHR is also triggered when a path loss measured by the terminal changes more than a threshold value.

As aforementioned, the terminal transmits a new PHR to the base station when a periodic timer expires, and then the terminal restarts the periodic timer periodically. Also, the terminal continuously monitors a path loss, and then the terminal transmits a new PHR when the monitored path loss changes more than a threshold value.

FIG. 5 is an exemplary view of transmitting a power headroom report (PHR) according to the related art. As depicted in the FIG. 5, if a new PHR transmitted time due to the path loss changes and a new PHR transmitted time due to the expiration of the periodic timer is relatively close, path loss thereafter is not significantly changed. Accordingly, information contained in the new PHR due to the expiration of the periodic timer is not much different from information contained in the new PHR due to the path loss changes. This may cause a great amount of radio resources waste. Namely, in the related art, there is a drawback of using unnecessary radio resource(s) during a PHR transmission procedure.

DISCLOSURE OF THE INVENTION

Therefore, an object of the present invention is to provide an improved method for effectively transmitting a power headroom report from a terminal to a base station, thereby preventing unnecessary radio resource usages causing by the related art.

To achieve these and other advantages and in accordance with the purpose of the present invention, as embodied and broadly described herein, there is provided a method of providing a power headroom reporting (PHR) in wireless communications system, the method comprising: determining whether the power headroom reporting is triggered; determining whether allocated uplink resources accommodate a medium access control (MAC) control element related to the power headroom reporting if at least one power headroom reporitng is determined to be triggered; and transmitting the MAC control element based on a value of a power headroom if the allocated uplink resources are determined to accommodate the MAC control element.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Figure 1:
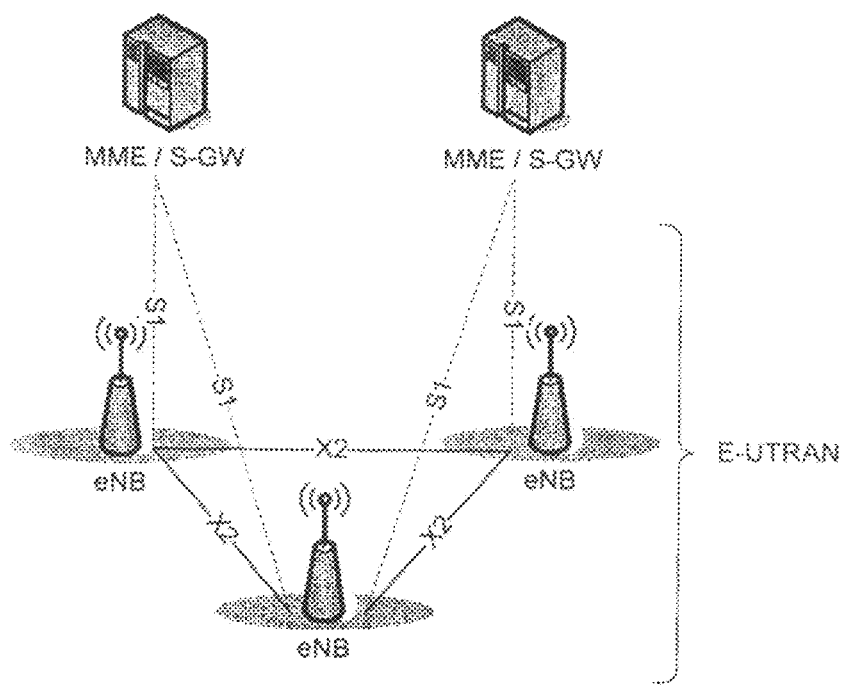
FIG. 1 shows a network structure of an E-UMTS, a mobile communication system, applicable to the related art and the present invention.
Figure 2:
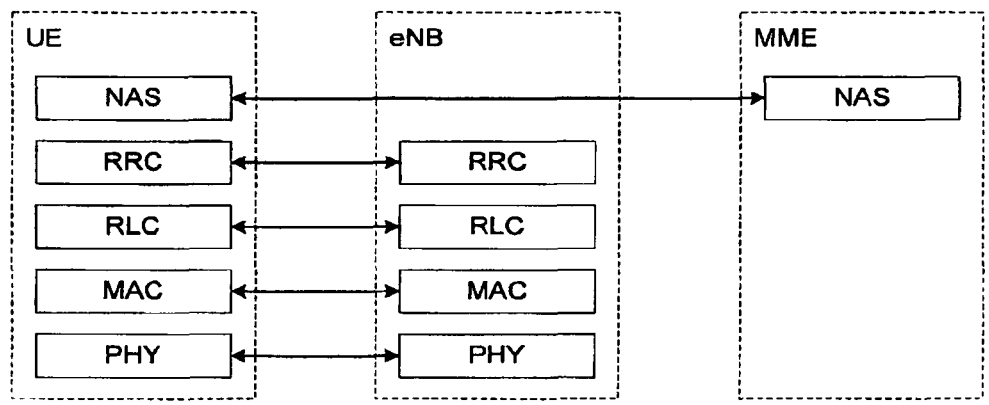
FIG. 2 shows an exemplary structure of a control plane of a radio interface protocol between a UE and a UTRAN (UMTS Terrestrial Radio Access Network) based on 3GPP radio access network standards according to the related art.
Figure 3:
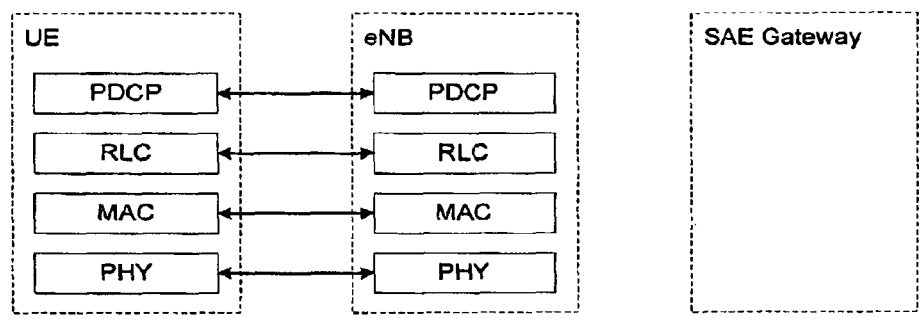
FIG. 3 shows an exemplary structure of a user plane of the radio interface protocol between the UE and the UTRAN based on 3GPP radio access network standards according to the related art.
Figure 4:
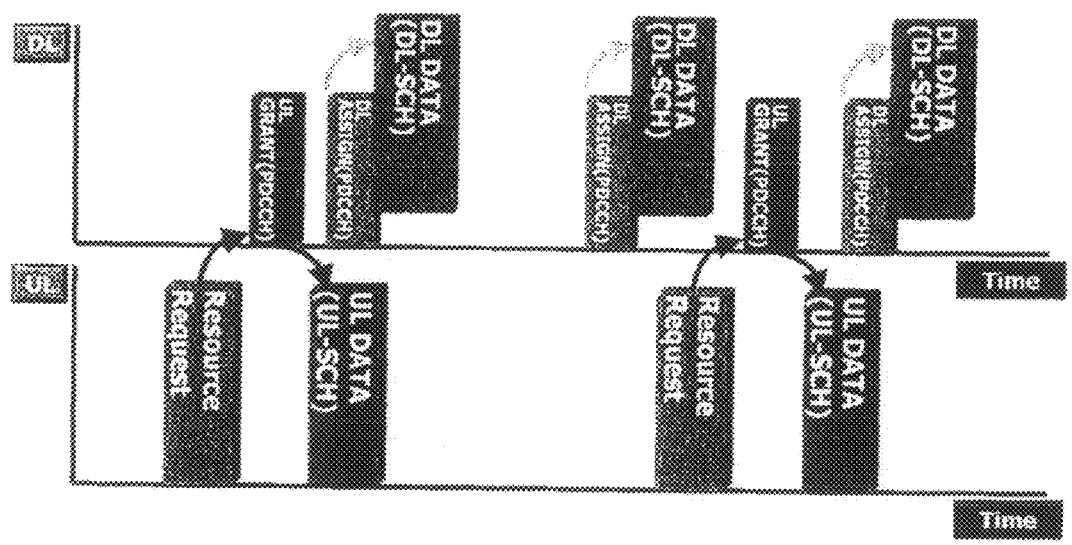
FIG. 4 is an exemplary view showing the operations of the dynamic radio resource allocation.
Figure 5:
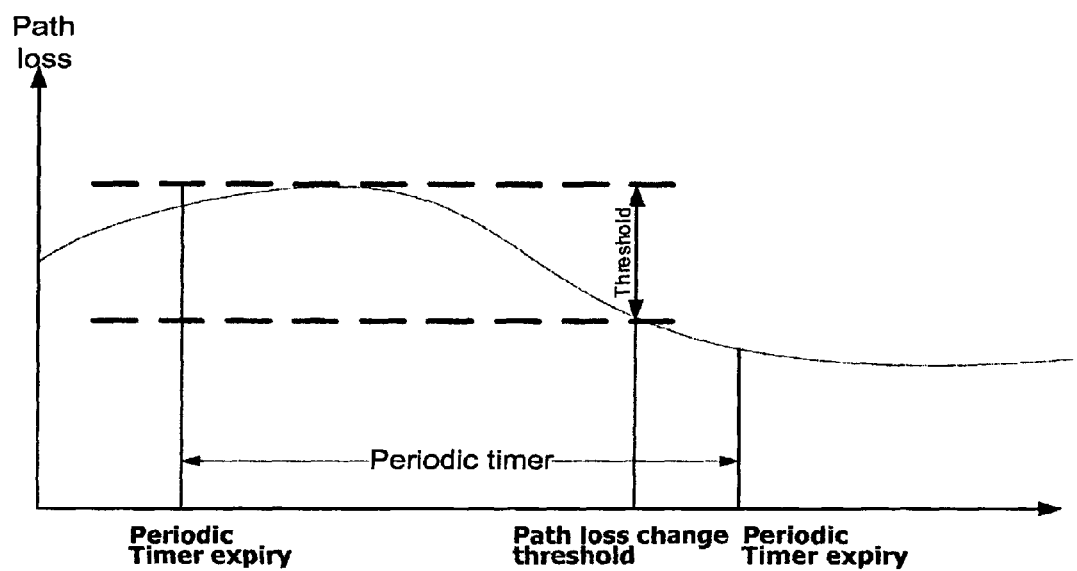
FIG. 5 is an exemplary view of transmitting a power headroom report (PHR) according to the related art.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, in order to prevent a waste of radio resource(s), a base station may need to know a power headroom reporting (PHR) of a terminal, thereby allocating a proper radio resource(s) for the terminal. A power headroom reporting procedure according to the present invention can be described as following. First, the power headroom reporting procedure is triggered by following conditions; 1) if a path loss changes more than a threshold value after a transmission of a PHR, 2) if a periodic PHR timer expires, or 3) if periodic PHR procedure or a PHR function is configured or reconfigured.

If the power headroom reporting procedure is triggered by one of the conditions, the terminal may check whether there is any newly allocated uplink resource(s) during a current transmission time interval (TTI). If there is the allocated uplink resource(s), the terminal may receive a power headroom value from a physical layer. Thereafter, the terminal may instruct a multiplexing and assembly (MA) entity to generate a PHR MAC control element (CE) based on the power headroom value. During the above procedure, if the PHR is a periodic PHR, the periodic PHR timer is restarted.

In general, the medium access control (MAC) layer is consisted of a plurality of entities, and each of the plurality of entities performs each own designated function. Among the plurality of entities, there is a multiplexing and assembly (MA) entity. The MA entity usually determines how to use an allocated radio resource for which data transmission. Further, the MA entity may generate or configure a MAC protocol data unit (PDU) based on such determination. For example, if the terminal receives a radio resource that allows to transmit 200 data bits, if a first logical channel has 150 transmittable data bits and a second logical channel has another 150 transmittable data bits, the MA entity may configure how much amount of data from each logical channel should be used, and then may generate the MAC PDU based on such configuration. In general, even if the radio resource(s) is allocated, all stored data in each of logical channels or all MAC CE (Control Element) generated in the MAC entity do not always be transmitted. Namely, when the PHR is triggered, even if the MAC entity receives an allocated radio resource(s), the PHR does not always be transmitted through the allocated radio resource(s). In other words, if the MA entity decides to transmit other high prioritized data rather than the PHR MAC CE, the MAC PDU does not include the PHR. In this case, since the base station fails to receive the PHR from the terminal, the radio resource may also not be properly allocated.

As aforementioned, this disclosure proposes to provide a method of effectively transmitting a power headroom report (PHR) from a terminal to a base station.

Figure 6:
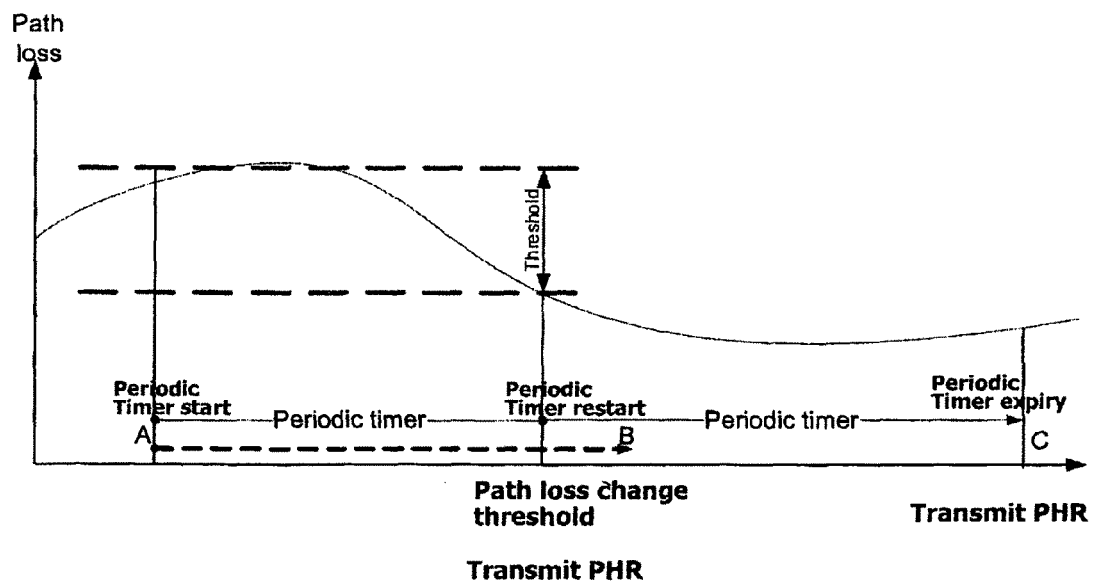
FIG. 6 is an exemplary view of transmitting a power headroom report (PHR) according to the present invention.

FIG. 6 is an exemplary view of transmitting a power headroom report (PHR) according to the present invention.

As depicted in the FIG. 6, according to the present invention, the terminal may restart a periodic PHR timer whenever the terminal transmits a PHR (or a periodic PHR) to the base station. Also, the terminal may restart the periodic PHR timer when a PHR is transmitted due to changes of a path loss. In the FIG. 6, according to the related art, a PHR has to be transmitted to the base station at a time B, as the periodic PHR timer expires at the time B. However, since the periodic PHR timer is restarted at a time when the PHR is transmitted due to the changes of the path loss, the PHR does not be transmitted to the base station at the time B, rather the PHR is transmitted to the base station at a time C when the restarted periodic timer expires. Accordingly, the present invention minimizes a number of unnecessary PHR transmissions.

Therefore, a first embodiment of power headroom reporting procedure according to the present invention can be described as following. First, the power headroom reporting procedure is triggered by following conditions; 1) if a path loss changes more than a threshold value after a transmission of a PHR, 2) if a periodic PHR timer expires, or 3) if periodic PHR procedure or a PHR function is configured or reconfigured.

If the power headroom reporting procedure is triggered by one of the conditions, the terminal may check whether there is any newly allocated uplink resource(s) during a current transmission time interval (TTI). If there is the allocated uplink resource(s), the terminal may receive a power headroom value from a physical layer. Thereafter, the terminal may instruct a multiplexing and assembly (MA) entity to generate a PHR MAC control element (CE) based on the power headroom value. During the above procedure, if the PHR is a periodic PHR, the periodic PHR timer is restarted.

Further, the present invention proposes to operate a power headroom reporting procedure based on a determination of multiplexing and assembly (MA) entity. More particularly, the MA entity determines whether a new MAC PDU can accommodate a PHR MAC control element (or MAC PHR CE). If it is determined that the new MAC PDU can not accommodate the PHR MAC CE, the PHR procedure is not triggered. In this case, the PHR MAC CE is not included in the new MAC PDU. In contrast, if the new MAC PDU can accommodate the PHR MAC CE, the PHR procedure may be triggered and the PHR may be transmitted after considering additional conditions. In this case, a periodic PHR timer is restarted, the PHR MAC CE is included in be new MAC PDU, and the new MAC PDU is transmitted.

Further, if a new uplink resource(s) is allocated, the MA entity may determine which data of logical channel or which MAC CE should be transmitted through the newly allocated uplink resource(s). After determination, if the MAC PDU accommodates the MAC PHR CE, the MA entity may notify this to the PHR procedure. Based on this notification, the PHR procedure may determines whether to trigger the PHR considering with a changes of path loss or a periodic PHR timer. If the PHR is triggered, the MA entity is instructed to include the PHR into the MAC PDU. Namely, if a triggered MAC PHR CE and a newly allocated resource(s) are existed, and if the newly allocated resource(s) can accommodate the MAC PHR CE, the MAC PHR CE is included in a MAC PDU, and the MAC PDU is transmitted thereafter.

Therefore, a second embodiment of power headroom reporting procedure according to the present invention can be described as following. First, the power headroom reporting procedure is triggered by following conditions; 1) if a path loss changes more than a threshold value after a transmission of a PHR, 2) if a periodic PHR timer expires, or 3) if periodic PHR procedure or a PHR function is configured or reconfigured.

If the power headroom reporting procedure is triggered by one of the conditions, the terminal may check whether there is any new PHR transmission after recent transmission of the PHR. After, if there is the new PHR transmission, the terminal may check whether there is any newly allocated uplink resource(s). If there is the new allocated uplink resource(s), the terminal may determine whether a MAC PDU, which will be transmitted through the new allocated uplink resource(s), can accommodate a PHR MAC CE as a result of a prioritization (i.e. logical channel prioritization). Then, if the new allocated resource can accommodate the PHR MAC CE, the terminal may receive a power headroom value from a physical layer. Thereafter, the terminal may instruct a multiplexing and assembly (MA) entity to generate a PHR MAC control element (CE) based on the power headroom value. Then, the terminal may restart a periodic PHR timer, and may cancel all PHR after restarting the periodic PHR timer.

Further, the present invention proposes to consider a type of PHR setting during a power headroom reporting procedure. Specifically, if a setting for the PHR procedure changes, it is determined whether to trigger the PHR or not based on the type of PHR setting. More particularly, if the PHR setting is changed by an upper layer (i.e., RRC layer), the prevent invention proposes to determine whether the change of the PHR setting indicates a termination of the PHR procedure. Thereafter, if the change of the PHR setting indicates to terminate the PHR procedure, the PHR is not triggered. In contrast, if the change of the PHR setting does not indicate to terminate the PHR procedure, the PHR may be triggered.

Therefore, a third embodiment of power headroom reporting procedure according to the present invention can be described as following. First, the power headroom reporting procedure is triggered by following conditions; 1) if a path loss changes more than a threshold value after a transmission of a PHR, 2) if a periodic PHR timer expires, 3) upon configuration of a PHR function, or 4) upon reconfiguration of PHR function, where the PHR reconfiguration is not used to disable the PHR function.

If the power headroom reporting procedure is triggered by one of the conditions, the terminal may check whether there is any new PHR transmission after recent transmission of the PHR. After, if there is the new PHR transmission, the terminal may check whether there is any newly allocated uplink resource(s). If there is the new allocated uplink resource(s), the terminal may determine whether a MAC PDU, which will be transmitted through the new allocated uplink resource(s), can accommodate a PHR MAC CE as a result of a prioritization (i.e. logical channel prioritization). Then, if the new allocated resource can accommodate the PHR MAC CE, the terminal may receive a power headroom value from a physical layer. Thereafter, the terminal may instruct a multiplexing and assembly (MA) entity to generate a PHR MAC control element (CE) based on the power headroom value. Then, the terminal may restart a periodic PHR timer, and may cancel all PHR after restarting the periodic PHR timer.

Here, The PHR MAC CE metioned in this disclosure is identified by a MAC PDU subheader with LCID, and it has a fixed size and consists of a single octet.

Further, as explained above, the Power Headroom reporting (PHR) procedure is used to provide the serving eNB with information about the difference between the nominal UE maximum transmit power and the estimated power for uplink (i.e., UL-SCH) transmission. RRC controls Power Headroom reporting by configuring the two timers periodicPHR-Timer and prohibitPHR-Timer, and by signalling path loss (i.e., dI-PathlossChange) which sets the change in measured downlink pathloss to trigger a PHR.

According to the presnet invention, a procedure text can be given as following:
A Power Headroom Report (PHR) shall be triggered if any of the following events occur:
  prohibitPHR-Timer expires or has expired and the path loss has changed more than dI-PathlossChange dB since the transmission of a PHR when UE has UL resources for new transmission;
  periodicPHR-Timer expires;
  upon configuration or reconfiguration of the power headroom reporting functionality by upper layers [8], which is not used to disable the function.
If the UE has UL resources allocated for new transmission for this TTI:
  if the Power Headroom reporting procedure determines that at least one PHR has been triggered since the last transmission of a PHR or this is the first time that a PHR is triggered, and;
  if the allocated UL resources can accommodate a PHR MAC control element as a result of logical channel prioritization:
    obtain the value of the power headroom from the physical layer;
    instruct the Multiplexing and Assembly procedure to generate and transmit a PHR MAC control element based on the value reported by the physical layer;
    start or restart periodicPHR-Timer;
    start or restart prohibitPHR-Timer;
    cancel all triggered PHR(s).

The present disclosure may provide a method of providing a power headroom reporting (PHR) in wireless communications system, the method comprising: determining whether the power headroom reporting is triggered; determining whether allocated uplink resources accommodate a medium access control (MAC) control element related to the power headroom reporting if at least one power headroom reporitng is determined to be triggered; and transmitting the MAC control element based on a value of a power headroom if the allocated uplink resources are determined to accommodate the MAC control element, wherein the MAC control element is included in a MAC protocol data unit (PDU), the MAC control element is a PHR MAC control element, the power headroom reporting is triggered by at least one of a path loss changes, a periodic timer for a PHR transmission, and a configuration or reconfiguration of the PHR functionality, the power headroom reporting is triggered if the path loss is changed more than a threshold value, the power headroom reporting is triggered if the periodic timer for the PHR trnamsision expires, the power headroom reproting is not triggered if the reconfiguration of the PHR functionality is used to disable the function, the allocated uplink resources accommodate the MAC control element as a result of logical channel prioritization, and the value of the power headroom is obtained from a physical layer.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMS, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of providing a power headroom reporting (PHR) in wireless communications system, the method comprising:
   determining whether a user equipment (UE) has allocated uplink (UL) resources for a new transmission for a current transmission time interval (TTI);
   determining whether at least one PHR is to be triggered, wherein the PHR is triggered by a configuration or reconfiguration of the PHR functionality by upper layers, which is not used to disable the PHR functionality;
   determining whether the allocated UL resources can accommodate a PHR medium access control (MAC) control element (CE) as a result of logical channel prioritization;
   if it is determined that the at least one PHR is to be triggered, the UE has the allocated UL resources for the new transmission for the current TTI, and the allocated UL resources can accommodate the PHR MAC CE as the result of logical channel prioritization, generating and transmitting the PHR MAC control element based on a power headroom value obtained from a physical layer;
   if it is determined that the allocated UL resources cannot accommodate the PHR MAC CE as the result of logical channel prioritization, determining whether the UE has the allocated UL resources for the new transmission for a next TTI;
   generating and transmitting the PHR MAC control element based on the power headroom value obtained from the physical layer if it is determined that the UE has the allocated UL resources for the new transmission for the next TTI; and
   starting a periodic PHR timer after transmitting the PHR MAC control element.

2. The method of claim 1, wherein the PHR MAC control element is included in a MAC protocol data unit (PDU).

3. The method of claim 1, wherein the power headroom reporting is triggered by at least one of a path loss changes, a periodic timer for a PHR transmission, and a configuration or reconfiguration of the PHR functionality.

4. The method of claim 3, wherein the power headroom reporting is triggered if the path loss is changed more than a threshold value.

5. The method of claim 3, wherein the power headroom reporting is triggered if the periodic timer for the PHR transmission expires.

6. The method of claim 3, wherein the power headroom reporting is not triggered if the reconfiguration of the PHR functionality is used to disable the function.

7. A user equipment (UE) configured for providing a power headroom reporting (PHR) in wireless communications system, the UE comprising:
   a processor configured to:
   determine whether a user equipment (UE) has allocated uplink (UL) resources for a new transmission for a current transmission time interval (TTI);
   determine whether at least one PHR is to be triggered, wherein the PHR is triggered by a configuration or reconfiguration of the PHR functionality by upper layers, which is not used to disable the PHR functionality;
   determine whether the allocated uplink (UL) resources can accommodate a PHR medium access control (MAC) control element (CE) as a result of logical channel prioritization;
   if it is determined that the at least one PHR is to be triggered, the UE has the allocated UL resources for the new transmission for the current TTI, and the allocated UL resources can accommodate the PHR MAC CE as the result of logical channel prioritization, generate and transmit the PHR MAC control element based on a-a power headroom value obtained from a physical layer;
   if it is determined that the allocated UL resources cannot accommodate the PHR MAC CE as the result of logical channel prioritization, determine whether the UE has the allocated UL resources for the new transmission for a next TTI;
   generate and transmit the PHR MAC control element based on the power headroom value obtained from the physical layer if it is determined that the UE has the allocated UL resources for the new transmission for the next TTI; and
   start a periodic PHR timer after transmitting the PHR MAC control element.

8. The user equipment (UE) of claim 7, wherein the PHR MAC control element is included in a MAC protocol data unit (PDU).

9. The user equipment (UE) of claim 7, wherein the power headroom reporting is triggered by at least one of a path loss changes, a periodic timer for a PHR transmission, and a configuration or reconfiguration of the PHR functionality.

10. The user equipment (UE) of claim 9, wherein the power headroom reporting is triggered if the path loss is changed more than a threshold value.

11. The user equipment (UE) of claim 9, wherein the power headroom reporting is triggered if the periodic timer for the PHR transmission expires.

12. The user equipment (UE) of claim 9, wherein the power headroom reporting is not triggered if the reconfiguration of the PHR functionality is used to disable the function.

* * * * *